(12) United States Patent
Kwon et al.

(10) Patent No.: US 8,797,972 B2
(45) Date of Patent: Aug. 5, 2014

(54) METHOD FOR RETRANSMITTING PACKETS ACCORDING TO DECODING FAILURES OR RELIABILITY

(75) Inventors: Yeong Hyeon Kwon, Anyang-si (KR); Hong Won Park, Anyang-si (KR); Sung Gu Cho, Anyang-si (KR); Ki Ho Nam, Anyang-si (KR); Dong Cheol Kim, Anyang-si (KR); Jin Sam Kwak, Anyang-si (KR); Sung Ho Moon, Anyang-si (KR); Hyun Woo Lee, Anyang-si (KR); Seung Hee Han, Anyang-si (KR); Min Seok Noh, Anyang-si (KR)

(73) Assignee: LG Electronics Inc., Seoul (KR)

( * ) Notice: Subject to any disclaimer, the term of this patent is extended or adjusted under 35 U.S.C. 154(b) by 408 days.

(21) Appl. No.: 12/741,685

(22) PCT Filed: Nov. 6, 2008

(86) PCT No.: PCT/KR2008/006532
§ 371 (c)(1),
(2), (4) Date: May 6, 2010

(87) PCT Pub. No.: WO2009/061133
PCT Pub. Date: May 14, 2009

(65) Prior Publication Data
US 2010/0265897 A1    Oct. 21, 2010

Related U.S. Application Data

(60) Provisional application No. 60/985,989, filed on Nov. 7, 2007.

(30) Foreign Application Priority Data

Feb. 4, 2008 (KR) .................. 10-2008-0011196

(51) Int. Cl.
| | | |
|---|---|---|
| *H04W 72/04* | (2009.01) | |
| *H04L 1/00* | (2006.01) | |
| *H04L 1/16* | (2006.01) | |
| *H04L 27/26* | (2006.01) | |
| *H04L 1/18* | (2006.01) | |

(52) U.S. Cl.
CPC ............ *H04L 1/0007* (2013.01); *H04L 1/1671* (2013.01); *H04L 27/2608* (2013.01); *H04L 1/1893* (2013.01); *H04L 1/1812* (2013.01)
USPC ....................................................... 370/329

(58) Field of Classification Search
CPC . H04L 1/0007; H04L 1/1671; H04L 27/2608; H04L 1/1893; H04L 1/1812
See application file for complete search history.

(56) References Cited

U.S. PATENT DOCUMENTS

| | | | |
|---|---|---|---|
| 6,604,216 B1* | 8/2003 | Javerbring et al. | 714/751 |
| 6,671,849 B2* | 12/2003 | Tripathi et al. | 714/746 |
| 6,798,846 B2 | 9/2004 | Golitschek Edler Von Elbwart et al. | |
| 7,058,005 B2* | 6/2006 | Ehrmann-Patin et al. | 370/208 |
| 7,149,192 B2* | 12/2006 | Kwak | 370/320 |
| 7,185,256 B2* | 2/2007 | Miki et al. | 714/751 |
| 7,747,922 B2* | 6/2010 | Mielczarek et al. | 714/748 |
| 7,839,940 B2* | 11/2010 | Borran et al. | 375/260 |
| 7,864,745 B2* | 1/2011 | Cai et al. | 370/343 |
| 2002/0046379 A1 | 4/2002 | Miki et al. | |
| 2002/0085486 A1* | 7/2002 | Ehrmann-Patin et al. | 370/210 |
| 2003/0217319 A1* | 11/2003 | Tripathi et al. | 714/751 |
| 2004/0196780 A1* | 10/2004 | Chin et al. | 370/208 |
| 2006/0195767 A1* | 8/2006 | Ihm et al. | 714/776 |
| 2011/0051657 A1* | 3/2011 | Li et al. | 370/328 |

FOREIGN PATENT DOCUMENTS

| | | |
|---|---|---|
| EP | 1124344 | 8/2001 |
| KR | 10-2004-0026231 A | 3/2004 |
| KR | 10-2006-0035322 A | 4/2006 |

OTHER PUBLICATIONS

Kumagai et al: "A maximal ratio combining frequency diversity ARQ scheme for OFDM signals", Personal, Indoor and Mobile Radio Communications, Sep. 8, 1998, pp. 528-532, XP010314535.

Atarashi et al: "Partial Frequency ARQ System for Multi-Carrier Packet Communication" IEICE Transactions on Communications, Aug. 1, 1995, pp. 1197-1203, XP000539755.

* cited by examiner

*Primary Examiner* — Mark Rinehart
*Assistant Examiner* — Kenneth P Hunt
(74) *Attorney, Agent, or Firm* — Mckenna Long & Aldridge LLP

(57) ABSTRACT

A method for retransmitting packets in accordance with decoding failure or reliability is disclosed. A method for retransmitting packets from a transmitting side in accordance with information of a receiving side comprises changing an order of packet symbols mapped with subcarriers, if retransmission information representing decoding success or reliability for a specific codeword is received from the receiving side mapping the packet symbols with the subcarriers in accordance with the changed order; and transmitting a codeword generated in accordance with the mapped result to the receiving side. Thus, it is possible to improve packet decoding success probability of the receiving side during initial transmission or retransmission by controlling a type of transmission packets in accordance with feedback information of the receiving side.

3 Claims, 12 Drawing Sheets

METHOD FOR RETRANSMITTING PACKETS ACCORDING TO DECODING FAILURES OR RELIABILITY

This application is a national phase application based on International Application No. PCT/KR2008/006532, filed on Nov. 6, 2008, which claims priority to U.S. Provisional Application No. 60/985,989, filed on Nov. 7, 2007 and Korean Patent Application No. 10-2008-0011196, filed on Feb. 4, 2008, all of which are incorporated by reference for all purposes as if fully set forth herein.

TECHNICAL FIELD

The present invention relates to a method for transmitting and retransmitting packets, and more particularly, to a method for retransmitting packets when parts constituting codewords have different types of reliability.

BACKGROUND ART

A communication system for next generation is designed to use frequency bands corresponding to broadbands and increase a data transmission rate between a transmitter and a receiver. For configuration of the communication system, OFDM based modulation is mainly adopted, and the wireless communication standard through the OFDM based modulation is applied to 3GPP LTE(+), 3GPP2 UMB(+), IEEE 802.16(d,e,m), IEEE 802.11, IEEE 802.20, IEEE 802.22, and HiperLAN. Examples of user classification modes include FDMA mode based on a frequency axis and a TDMA mode based on a time axis. In the communication standard configured to be used at low cast, such as wireless LAN and HyperLAN, CSMA corresponding to the TDMA mode is mainly used. On the other hand, in the system such as 3GPP LTE, 3GPP2 UMB, and IEEE 802.16, which supports commercial voice communication, traffics of respective user equipments are distinguished by FDM scheme to maximize frequency efficiency. Accordingly, the above systems allow data to be transmitted between a base station and a mobile station under the control of the base station, and information of the control is transferred to the mobile station through scheduling information.

In a communication procedure between a mobile station and a base station, scheduling for obtaining multi-user diversity is mainly used to maximize frequency efficiency. In other words, frequency resources are allocated in such a manner that a specific mobile station can obtain maximum throughput using minimum frequency resources. The scheduling result according to the above allocation is set to be decoded by the mobile station without error and then transferred. However, if channel status of the mobile station is not good, packet transmission between the base station and the mobile station does not end only one time but is accompanied with retransmission. Time-diversity and transmission energy boosting effects can simultaneously be obtained by packet retransmission. Although maximum throughput that can be obtained is reduced, packet retransmission is properly performed to configure a reliable channel. A hybrid automatic repeat request (HARQ) mode is mainly used for initial transmission/retransmission of packets as above. Packets transmitted and received between the mobile station and the base station are encoded through a channel code. Various HARQ modes are generated in accordance with a method of converting packets in various formats. The simplest method is that all codewords are used for every packet transmission. In this case, a receiving side performs decoding using chase combining. This method is one of methods of simply performing retransmission. As another method, there is provided a method of transmitting codewords by splitting them. This method is used by an incremental redundancy (IR) scheme. If there is new code bit information in retransmitted packets, it means that additional information is received. If the existing bits are received, bit combining is used.

FIG. 1 illustrates a procedure of generating packets according to HARQ.

FIG. 1 illustrates that configuration of transmission packets may be varied whenever the packets are transmitted through HARQ. If chase combining is used, packets are equally configured whenever they are transmitted. However, if IR is used, configuration of packets may be varied whenever the packets are transmitted.

FIG. 2 illustrates a procedure of decoding transmission packets from a signal combined in a receiving side.

If packets of FIG. 1 are received, the receiving side sets a part of the packets which are not transmitted from the position of each codeword bit to reliability of 0 and performs decoding, i.e., soft decision decoding. Alternatively, the receiving side assumes the part of the packets which are not transmitted as erasure and then performs decoding, i.e., hard decision decoding.

Also, in case of codeword bits transmitted in a multi-mode, the transmitted bits are used by combination. In this case, the bits may be combined with one another in accordance with soft decision or hard decision. When the bits are combined with one another in accordance with soft decision, it is assumed that channel correction has been performed. Then, the receiving side combines the receiving signals with one another and averages them through analog type or multi-bit precision. In this case, weighted combining can be performed in accordance with accuracy of the received bits. On the other hand, if only bits of 0 and 1 are required like hard decision decoding, 0 and 1 are selected based on majority when the respective bits are combined with one another.

Equation 1 represents soft combination when soft decoding is performed, and Equation 2 represents multi-selection when hard decoding is performed. The actual configuration of each of Equations 1 and 2 may be varied depending on a decoding method.

$$R(k) = \sum_{i=1}^{N_R} w(k,i) r(k,i) \quad \text{[Equation 1]}$$

$$R(k) = \begin{cases} 1, & \sum_{j=1}^{N_R} w(k,i) r(k,i) > \frac{N_R}{2} \\ 0, & \text{Otherwise} \end{cases} \quad \text{[Equation 2]}$$

In this case, R(k) means soft/hard decision information of the received bits, r(k,i) means soft/hard value in the ith HARQ packet reception, and w(k,i) means a weight value to be applied to a corresponding bit in each transmission packet when combining is performed.

The aforementioned transmission/decoding method is suitable for a general blind channel. Also, the channel can have optimal throughput in a state that all bits have the same uncertainty as one another, like AWGN.

However, in the packet transmission and retransmission method according to the related art, throughput may be varied depending on channel/transmission type to which the aforementioned decoding method is applied.

DISCLOSURE

Technical Problem

The embodiments of the present invention provide a method for solving problems of packet transmission, which are caused by uncertainty between a transmitting side and a receiving side and inter-cell interference in a communication system.

An object to be achieved by the present invention is to provide a method for retransmitting packets, which can improve packet decoding success probability of a receiving side during initial transmission or retransmission by controlling a type of transmission packets to decode the packets in the receiving side.

Technical Solution

In order to achieve the aforementioned object, in one aspect of the present invention, a method for retransmitting packets from a transmitting side in accordance with information of a receiving side comprises changing an order of packet symbols mapped with subcarriers, if retransmission information representing decoding success or reliability for a specific codeword is received from the receiving side; mapping the packet symbols with the subcarriers in accordance with the changed order; and transmitting a codeword generated in accordance with the mapped result to the receiving side.

Preferably, the step of changing the mapping order includes rotating the mapping order of the packet symbols along a frequency axis.

Preferably, the step of rotating the mapping order along the frequency axis includes dividing the subcarriers into arbitrary blocks and rotating the order of the subcarriers along the frequency axis within each block.

Preferably, the step of changing the mapping order includes determining an arrangement order of the subcarriers as the mapping order of the packet symbols after swapping the subcarriers in a unit of a random block.

Preferably, the step of changing the mapping order includes determining the packet symbols after performing permutation for the subcarriers in accordance with a permutation rule which is previously determined.

Preferably, the step of changing the mapping order includes determining a mapping order different from a previous transmission time per retransmission.

In another aspect of the present invention, a method for retransmitting packets from a transmitting side in accordance with information of a receiving side comprises controlling sizes of a block where decoding has been failed and a block where decoding has been successfully performed, depending on whether decoding has been successfully performed if retransmission information representing whether decoding has been successfully performed for a specific block constituting codewords is received from the receiving side; and transmitting codewords to the receiving side, the codewords being comprised of the block where decoding has been failed and the block where decoding has been successfully performed.

Preferably, the step of controlling the sizes of the blocks includes increasing the amount of parities of the block where decoding has been failed, in the receiving side in accordance with the retransmission information, and decreasing the amount of parities of the block where decoding has been successfully performed.

Preferably, the step of controlling the sizes of the blocks includes mapping the block where decoding has been failed with a frequency band having the highest reliability.

Preferably, the step of controlling the size of the block includes increasing the amount of parities of the block if the block has low reliability in accordance with the retransmission information, and decreasing the amount of parities of the block if the block has high reliability.

Preferably, the step of controlling the size of the block includes mapping the block having high reliability with a frequency band having low reliability and mapping the block having low reliability with a frequency band having high reliability.

Preferably, the step of controlling the size of the block includes constituting codewords with only the block where decoding has been failed in the receiving side in accordance with retransmission information representing whether decoding has been successfully performed is received from the receiving side.

In other aspect of the present invention, a method for retransmitting packets from a transmitting side in accordance with information of a receiving side comprises allocating a resource depending on whether decoding has been successfully performed or reliability if retransmission information representing decoding success or reliability is received from the receiving side; and transmitting codewords to the receiving side, the codewords being comprised of the block to which the resource is allocated.

Preferably, the step of allocating the resource includes applying a demodulation method depending on decoding success of the corresponding block.

Preferably, the step of allocating the resource includes applying a repetition depending on decoding success of the corresponding block.

Preferably, the step of allocating the resource includes applying a mapping method depending on decoding success of the corresponding block.

Preferably, the codeword distance between the respective codewords is uniform.

Advantageous Effects

According to the embodiments of the present invention, it is possible to improve packet decoding success probability of the receiving side during initial transmission or retransmission by controlling a type of transmission packets in accordance with feedback information of a receiving side.

BEST MODE

Hereinafter, the preferred embodiments of the present invention will be described with reference to the accompanying drawings. It is to be understood that various modifications can be made in the following embodiments of the present invention and the scope of the present invention will not be limited to the following embodiments.

The present invention is intended that reliability of all codeword bits received to improve decoding performance is set equally when a receiving side decodes a channel-coded signal. In this case, channel coding performance is determined by minimum codeword distance so as to obtain optimal throughput. In order to equally obtain reliability of all codeword bits from the received signal, modulation, repetition, and channel mapping can be considered, and reliability of final soft bits should be obtained equally. If the amount of feedback information is not considered, the receiving side feeds reliability of all received bits back to a transmitting side, and the transmitting side performs optimal modulation and mapping for each bit. This method will be referred to as reliability based-HARQ, and its performance is verified sufficiently. However, in the actual system, the amount of feedback information is limited. In a general communication system, feedback information is limited to 1 bit, approximately. In this case, the transmitting side performs randomization so that codeword bits have similar reliability on the average. An example of randomization includes permutation. This permutation is applied to a case where each bit has its own reliability like modulation order of 16-QAM or greater.

Figure 1:
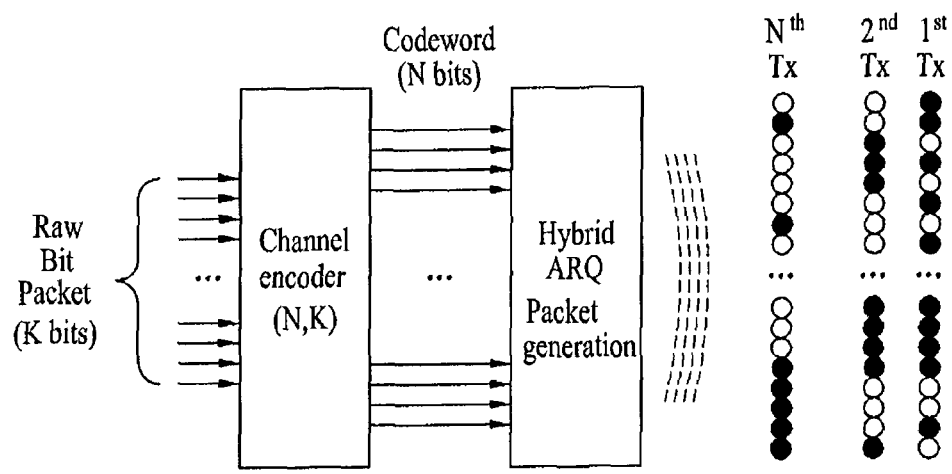
FIG. 1 is a diagram illustrating a procedure of generating packets according to HARQ.
Figure 2:
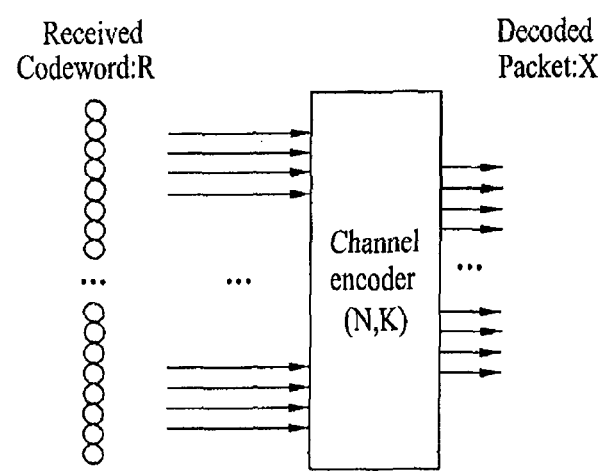
FIG. 2 is a diagram illustrating a procedure of decoding transmission packets from signals combined in a receiving side.
Figure 3:
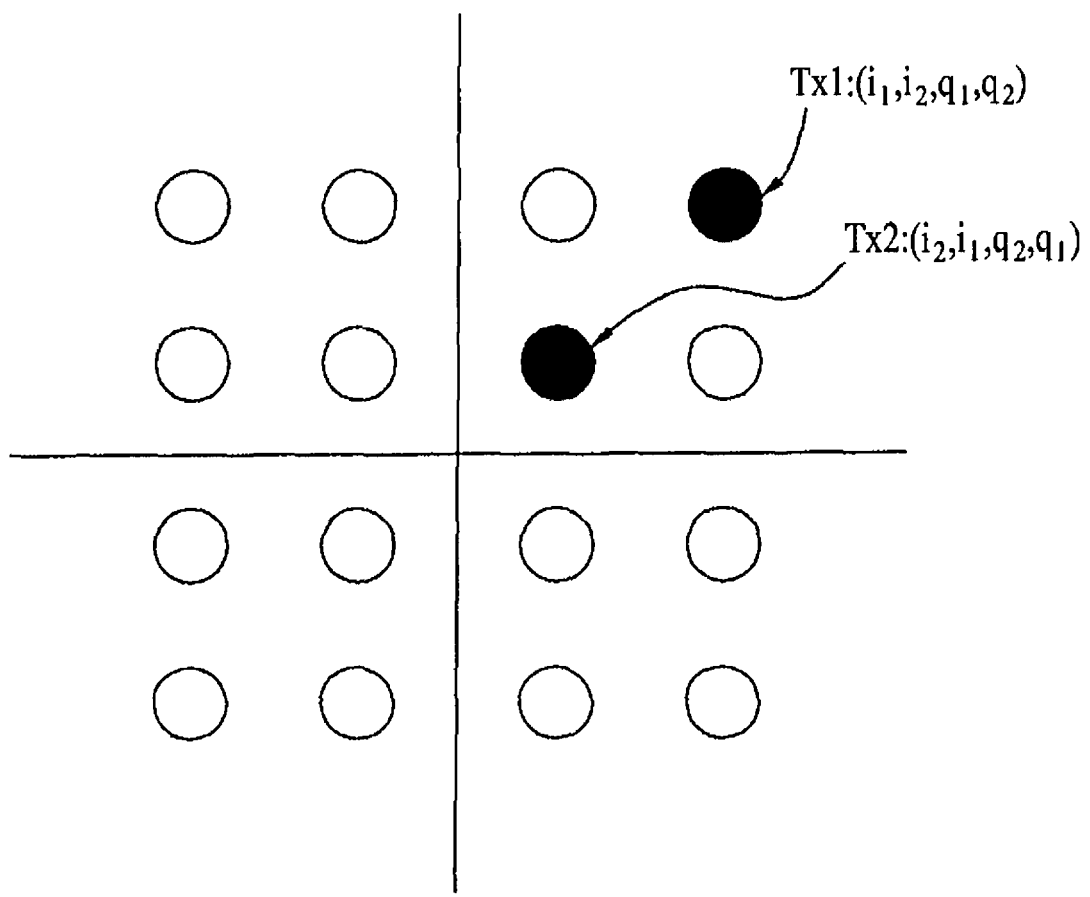
FIG. 3 is a diagram illustrating an example of permutation of constellation symbol bits.

FIG. 3 is a diagram illustrating an example of permutation of constellation symbol bits.

When same codeword bits are retransmitted, it is considered that the same codeword bits are mapped in a bit position of modulation symbols so as to allow different codeword bits to have a similar modulation order after retransmission.

The method of FIG. 3 can solve a problem caused when high modulation is used instead of change between blocks according to channel change. However, although uniform bit reliability generally occurs in QPSK mode, a problem occurs in that codeword bits actually have their respective reliability different from one another within the system, which occupies a broadband channel, i.e., within one transmission unit. Particularly, in a state that bit reliability sufficient to classify codewords is required for all regions, even though reliability of specific bits has been enhanced, in view of characteristics of channel code, decoding performance is not improved. This status occurs in the case that reliability of the received signal is changed by deep fading of channel response or instantaneous interference and jamming.

Figure 4:
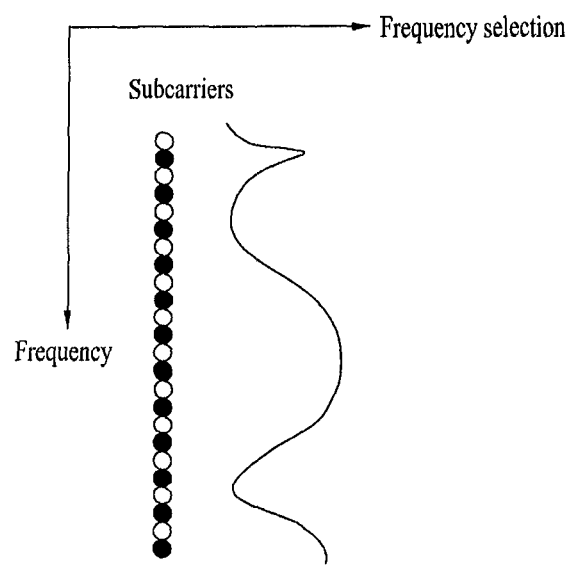
FIG. 4 and FIG. 5 are diagrams illustrating examples of frequency selection when channels are arranged at constant intervals based on a frequency axis.
Figure 5:
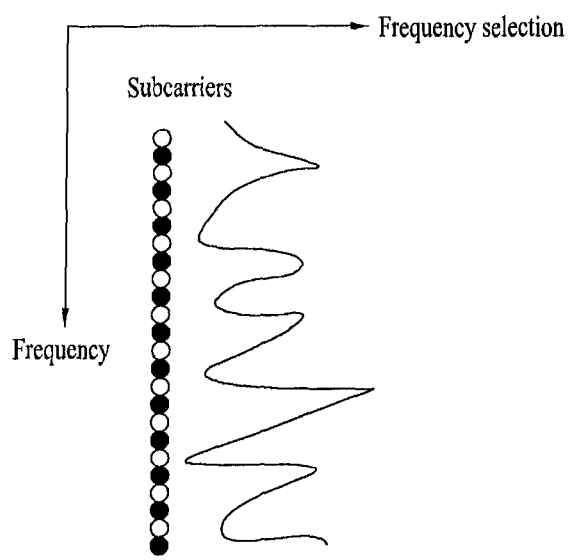

FIG. 4 and FIG. 5 are diagrams illustrating subcarrier selection and channel change on a frequency axis. In FIG. 4, channel status is not good in some blocks while channel status is good in another some blocks. On the other hand, in the case that channel is rapidly changed on the frequency axis as illustrated in FIG. 5, it is not possible to identify channel status, i.e., whether the channel is good or not. In this case, it is possible to identify the channel status in a unit of codeword bits.

Figure 6:
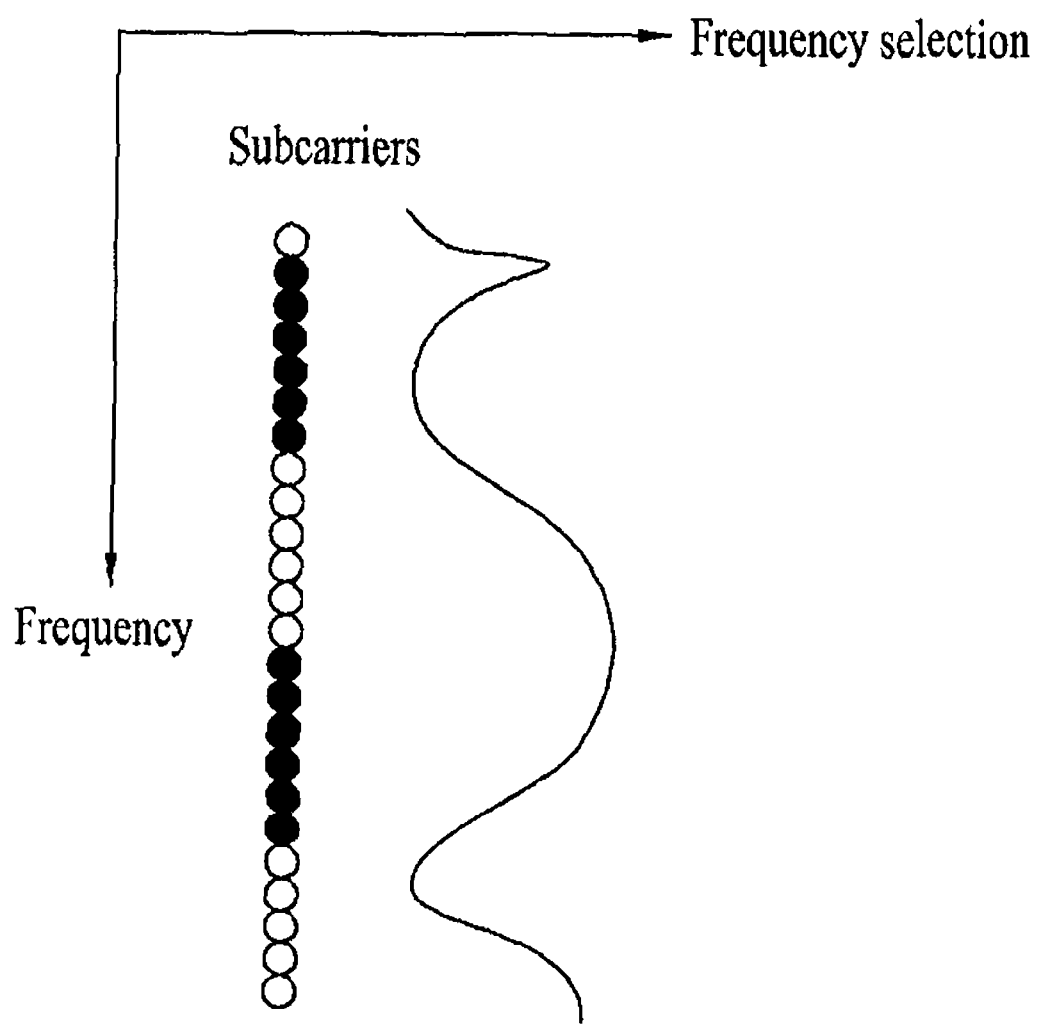
FIG. 6 is a diagram illustrating an example of frequency selection when channels are dispersed and allocated to a plurality of regions.

FIG. 6 is a diagram illustrating an example of frequency selection when channels are dispersed and allocated to a plurality of regions.

As illustrated in FIG. 6, if subcarriers are not allocated at constant intervals but locally allocated to several places, the codeword bits respond to channel change on the frequency axis more susceptibly. In this way, if the codeword bits are transmitted, they are very susceptible to channel characteristics for each block. Accordingly, even though information such as channel CQI cannot be used due to non-exactness, the receiving side analyzes features of the received signal and makes reliability of the received codeword bits equal based on the analyzed result.

The aforementioned status occurs when a mobile station in a poor status like cell-edge user locally uses a specific band. In this case, interference components of neighbor cell may occur within a greater range at a specific moment, or may occur within a smaller range in a specific section. The base station allocates a specific bandwidth to the mobile station based on multi-user scheduling. The mobile station can be located within a cell without any restriction. Accordingly, if the mobile station transmits uplink traffic, a component of a signal received by the base station includes an interference signal of a neighbor cell, wherein interference level is varied depending on where the mobile station which uses the specific bandwidth is located.

Figure 7:
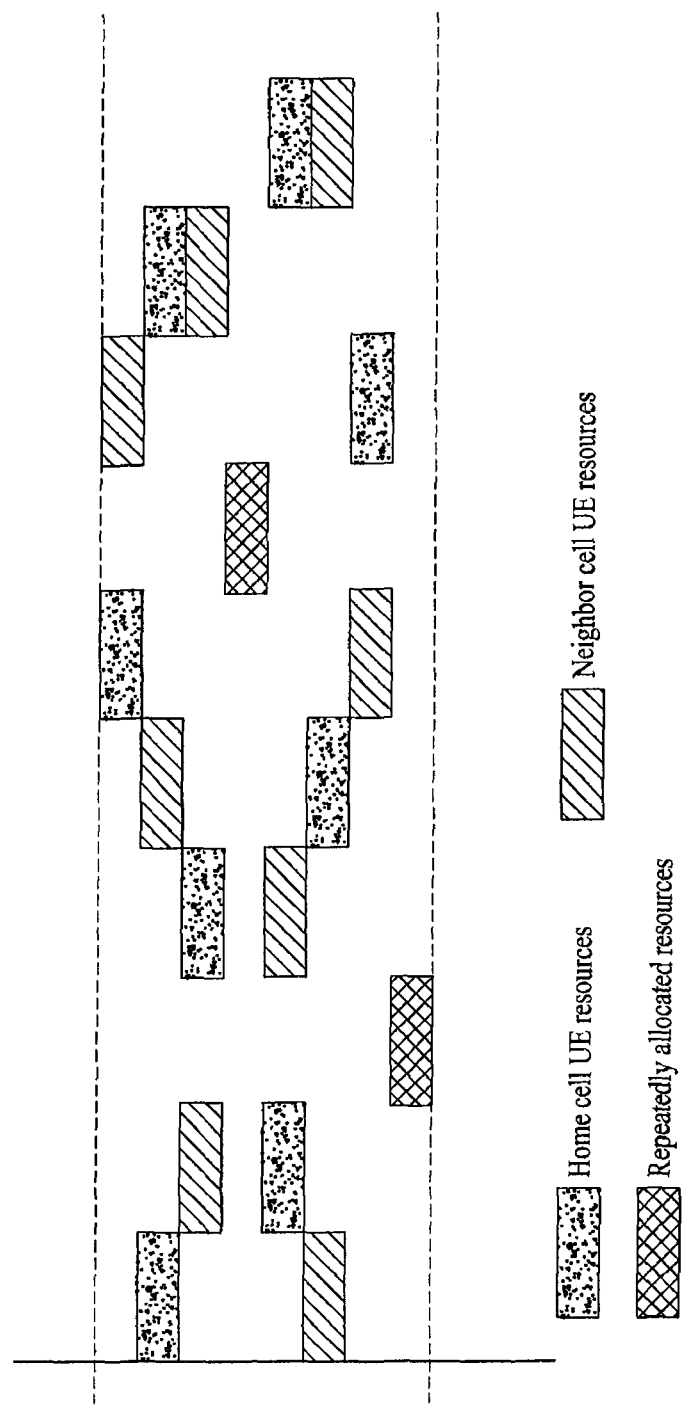
FIG. 7 is a diagram illustrating a flow of resource allocation to mobile stations in the boundary of cells.

FIG. 7 illustrates a flow of resource allocation for mobile stations in the boundary of cells.

As illustrated in FIG. 7, if the same frequency resource is allocated to the mobile stations in the boundary of cells, the mobile stations in the boundary of cells exist in the position closest to a neighbor cell while transmitting a signal at the greatest power. At this time, instantaneous interference increases, and interference occurs in a specific part of a codeword more greatly than any other part if a codeword length exceeds one transmission unit, whereby parts having different types of reliability occur. If all the codewords are retransmitted to the parts having different types of reliability, in the same type, loss may occur. Namely, if resources are used so that blocks have different lengths, the loss may occur more easily.

The embodiments of the present invention provide a method for retransmitting packets when different types of reliability occur within one codeword of time/frequency axes.

Different types of reliability occur between codeword bits on the frequency axis because of channel change on the frequency axis. In order to avoid different types of reliability, packet transmission may be performed by information of the receiving side, or may be performed by blind detection. When the transmitting side performs packet transmission through information of the receiving side, there are provided two cases, i.e., the case where the receiving side simply indicates decoding success and failure only and the case where the receiving side feeds reliability information back to the transmitting side.

Figure 8:
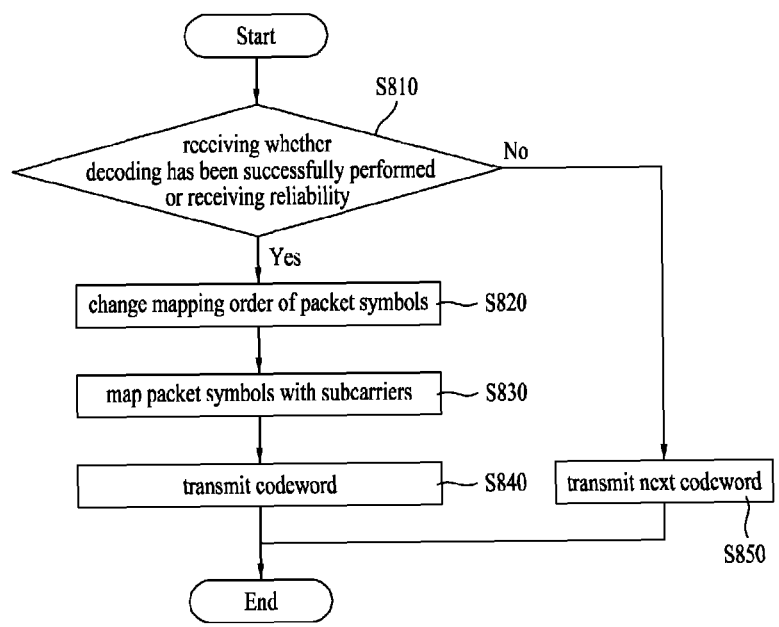
FIG. 8 is a flow chart illustrating a method for retransmitting packets according to one embodiment of the present invention.

FIG. 8 is a flow chart illustrating a method for retransmitting packets according to one embodiment of the present invention.

First of all, it is determined whether the receiving side has successfully performed decoding for a specific codeword or reliability has been received from the receiving side (S810). If retransmission information representing whether decoding has been performed for a specific codeword or reliability is not received, the transmitting side transmits next codeword (S850).

If retransmission information representing whether decoding has been performed for a specific codeword or reliability is received, the transmitting side changes mapping order of packet symbols mapped with subcarriers (S820).

If the receiving side notifies codeword decoding success and failure, the transmitting side cannot identify whether success and failure of the receiving side have been caused by low SNR or characteristics of channel status. Accordingly, the transmitting side uses rotation, swapping or permutation, which is previously determined.

Meanwhile, the receiving side may transfer reliability information for each block to the transmitting side by classifying blocks of the packet. On the other hand, the transmitting side cannot identify whether the receiving side has successfully performed decoding. The transmitting side changes mapping order of subcarriers in accordance with reliability information of the receiving side. In this case, the information fed back from the receiving side may simply designate reliability, or may be guideline to be followed by the transmitting side. Namely, if there is a subcarrier mapping rule, which is previously determined, such as rotation or permutation, the receiving side can designate a specific rule.

Next, packet symbols are mapped with subcarriers in accordance with the changed mapping order (S830).

Finally, the transmitting side transmits the codeword generated in accordance with the mapping result to the receiving side (S840).

In the embodiment of the present invention, the packet symbols may be a set of symbols transmitted using multi-antenna such as MIMO. In this case, if each transmission symbol has its own reliability different from that of another transmission symbol within the symbol set, the order of transmission symbols within the corresponding set can be changed depending on reliability.

Figure 9:
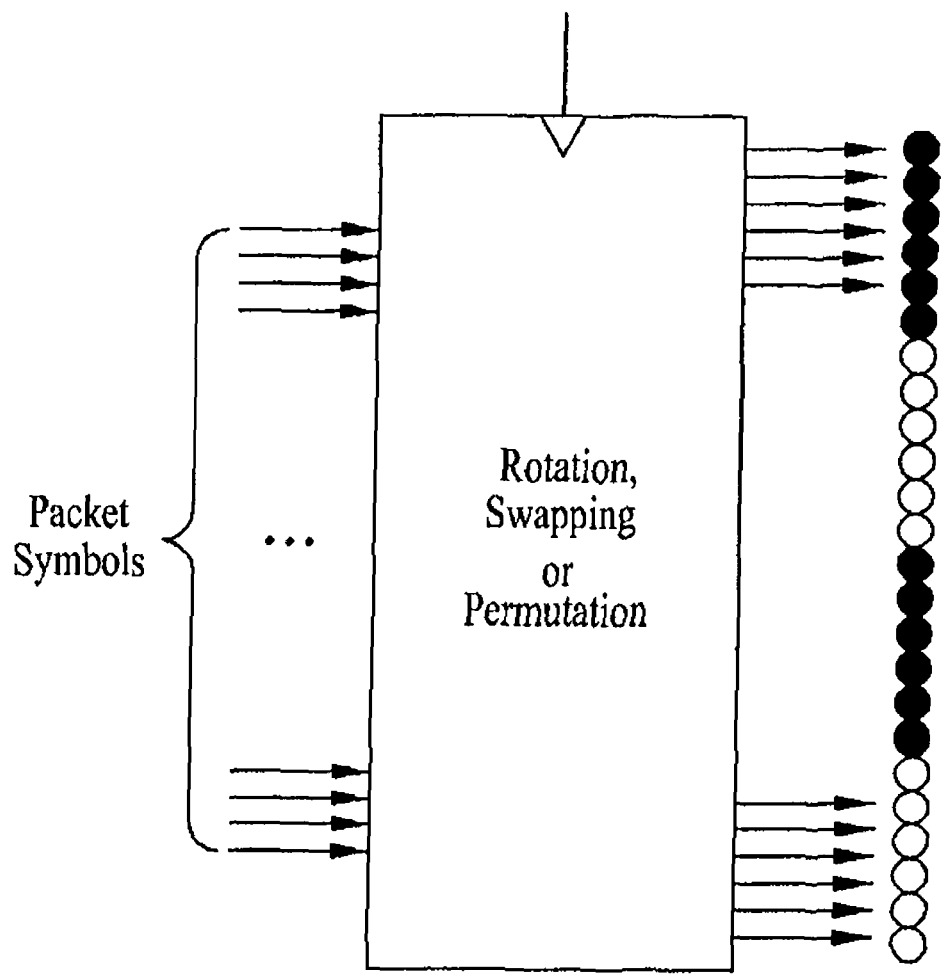
FIG. 9 is a diagram illustrating an example of a mapper performing a change procedure of mapping order.

FIG. 9 is a diagram illustrating an example of a mapper performing a change procedure of mapping order of FIG. 8.

FIG. 9 illustrates that mapping may be varied by a control signal (Bit/Block rotation/swapping/permutation control) per retransmission or transmission when the packet symbols are applied to real subcarriers through the mapper.

Figure 10:
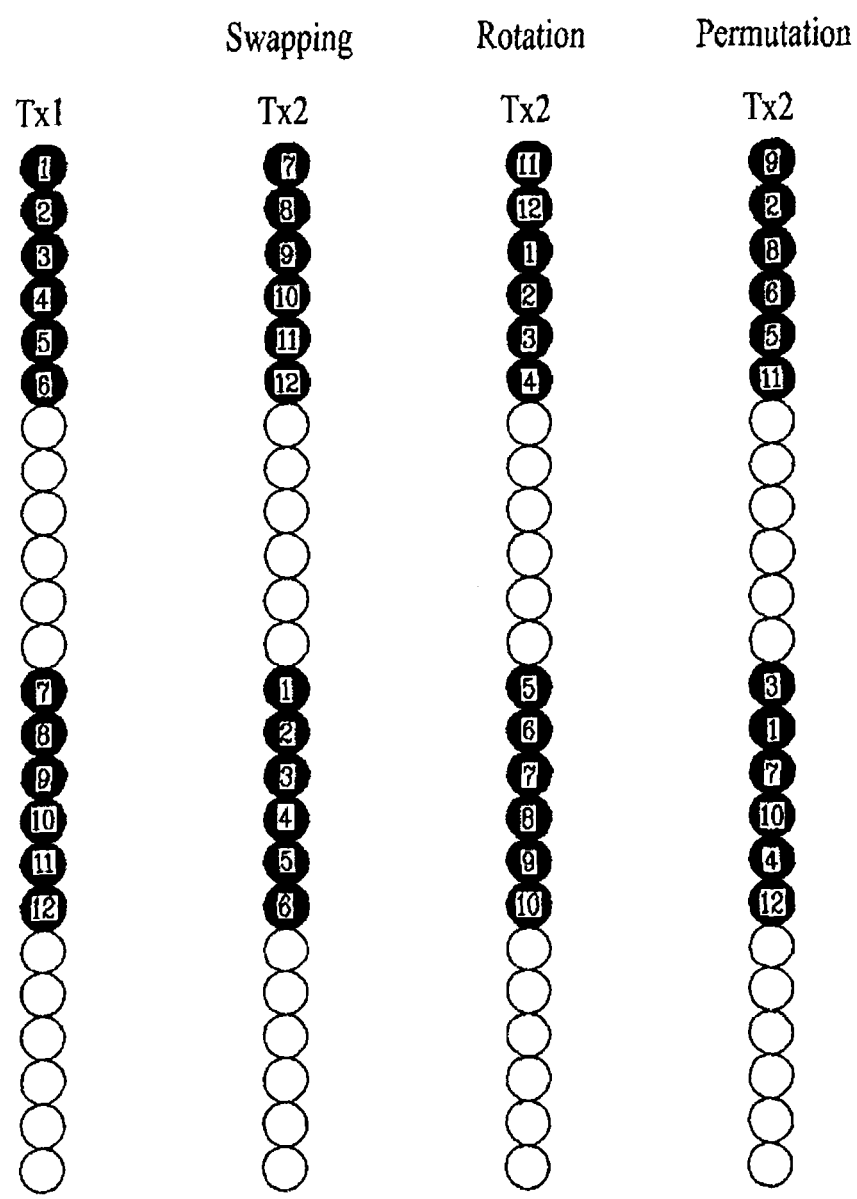
FIG. 10 is a diagram illustrating an example that mapping order of symbols is changed in accordance with FIG. 9.

FIG. 10 is a diagram illustrating an example that mapping order of symbols is changed in accordance with FIG. 9.

In the embodiment of the present invention, in order to map packet symbols with subcarriers on the frequency axis, mapping order of physical subcarriers is controlled. For example, swapping may be performed in such a manner that subcarriers are switched with one another in a unit of block, mapping may be performed in such a manner that physical subcarriers are rotated as much as the determined amount, or mapping order of subcarriers to be used for retransmission may be changed in accordance with a determined permutation rule. In case of swapping in a unit of block, mapping order between symbols and subcarriers may be changed within the block.

Figure 11:
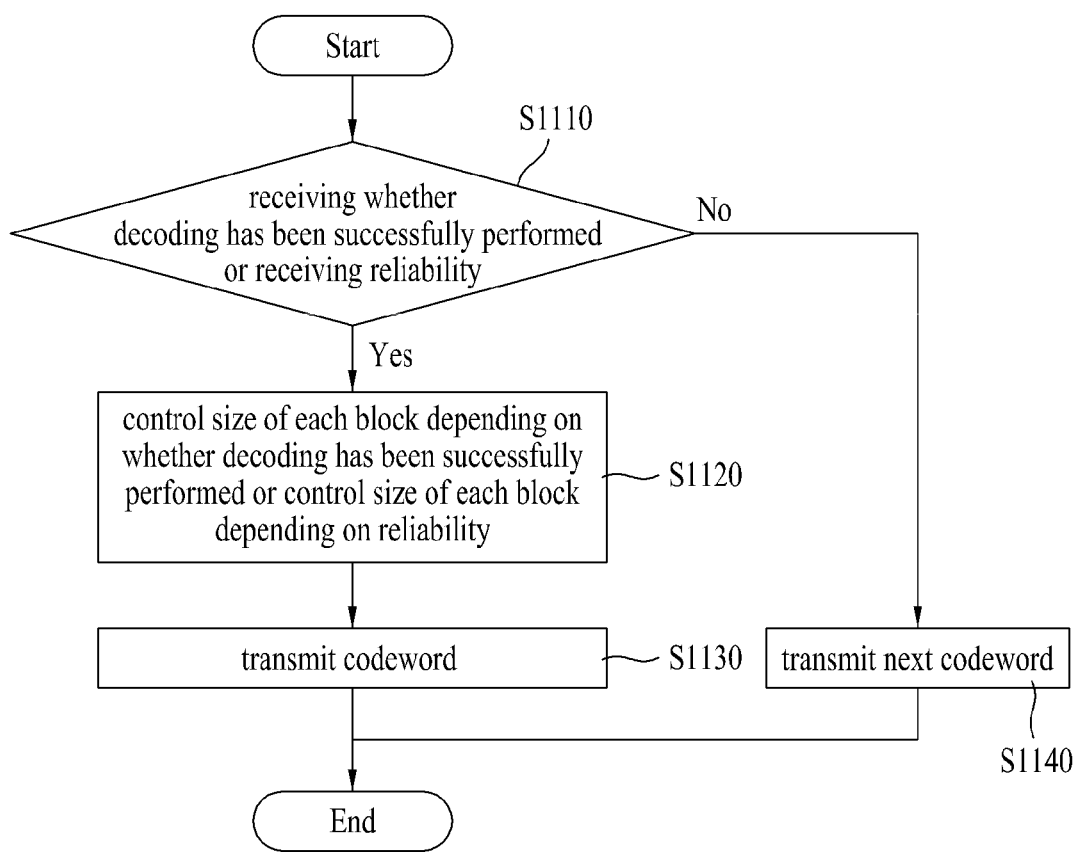
FIG. 11 is a flow chart illustrating a method for retransmitting packets according to another embodiment of the present invention.

FIG. 11 is a flow chart illustrating a method for retransmitting packets according to another embodiment of the present invention.

First of all, it is determined whether the receiving side has received retransmission information representing whether decoding for a specific block constituting codewords has been successfully performed or reliability (S1110). If the receiving side feeds reliability or success or failure of partial packets back to the transmitting side, the amount of data transmitted from the receiving side increases. If it is assumed that this feedback information ensures reliability, like DL feedback, the receiving side can previously indicate action to be taken by the transmitting side.

If the information fed back from the receiving side divides packets in a unit of block and success and failure of decoding can be determined partially for each block, the receiving side feeds retransmission information back to the transmitting side, wherein the retransmission information includes information as to whether decoding has been successfully performed. In order to determine whether decoding has been successfully performed for each block, the transmitting side can transfer information such as CRC to the receiving side. In this case, the block is a unit of one or more subcarriers, and the respective blocks divided from one another can have different lengths. Also, the blocks can be reordered in a codeword type or a receiving signal type.

Particularly, if the receiving side fails to determine whether decoding has been successfully performed, the receiving side can transfer reliability information to the transmitting side by dividing the blocks from one another.

At this time, if the retransmission information indicating whether decoding has been successfully performed for a specific block or reliability is not received, the transmitting side transmits next codeword (S1140).

If the retransmission information representing whether decoding has been successfully performed for a specific block or reliability is received from the receiving side, the transmitting side controls sizes of block where decoding has been failed and block where decoding has been successfully performed depending on whether decoding has been successfully performed or reliability (S1120).

If there is any element that can affect blocks, such as interleaver, the part where decoding has been successfully performed is preferably transmitted. In this case, it is possible to reduce size of the block where decoding has been successfully performed or the block where reliability is high and control the amount of parities for the failed block. Namely, it is possible to control the amount of energy by increasing codeword bits of the corresponding block or controlling the repetition or modulation order depending on whether decoding has been successfully performed for each block or reliability.

The transmitting side can control the length of the blocks where decoding has been successfully performed, to reach 0 using the retransmission information fed back from the receiving side. Namely, the transmitting side can perform retransmission for only the failed blocks without retransmitting the blocks where decoding has been successfully performed.

Since the failed blocks should have reliability during retransmission, the corresponding failed blocks are mapped with a band having high reliability in the receiving side on the subcarrier mapping. In this case, rotation or permutation can be used. Also, if the block where decoding has been successfully performed is not retransmitted, the failed block can occupy the position of the block where decoding has been successfully performed. On the other hand, if the block where decoding has been successfully performed is transmitted together with the failed block, codeword bits are arranged at a position having relatively low reliability for the block where decoding has been successfully performed.

Finally, the transmitting side transmits codewords of which size is controlled per block to the receiving side (S1130).

Figure 12:
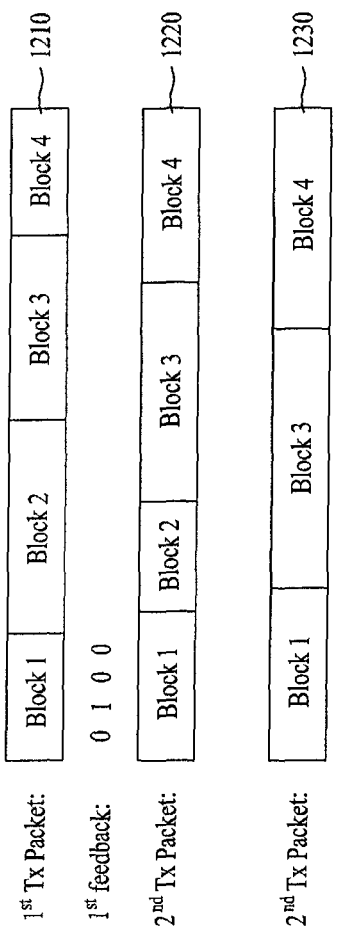
FIG. 12 is a diagram illustrating an example of a block size of retransmission packets according to a block size control procedure of FIG. 11.

FIG. 12 is a diagram illustrating an example of a block size of retransmission packets according to a block size control procedure of FIG. 11.

It is assumed that after codewords or packets constituting blocks (1210) having similar length are initially transmitted, feedback information is received from the receiving side. At this time, the second block corresponding to '1' in the feedback information means the block where decoding has been successfully performed or the block having high reliability. In this case, the feedback information does not need to be mapped with each block 1:1.

Therefore, in the codewords or packets (1220) to be transmitted, the second block may be shorter than any other blocks, or may be omitted from the codewords or packets (1230) to be transmitted.

The method for retransmitting packets between the transmitting side and the receiving side through a channel has been described as above.

However, if the transmitting side is affected by a transmitting signal of another transmitting side of another cell such as a neighbor cell, interference increases in a specific frequency position or time position, and reliability for a specific block can be reduced. This status can occur in both the frequency axis and the time axis, and it is not possible to identify which part will be affected by another transmitting signal during next transmission. For this reason, the transmitting side cannot adaptively perform modulation or repetition control. Namely, the modulation order or modulation symbol bit mapping order can be changed simply by decoding error, or it is possible to allow the receiving side to use more energy through repetition.

According to another embodiment of the present invention, the mobile station notifies reliability of specific blocks or whether decoding has been successfully performed for the specific blocks, and the transmitting side can allocate more resources to the block having low reliability or the failed block.

Figure 13:
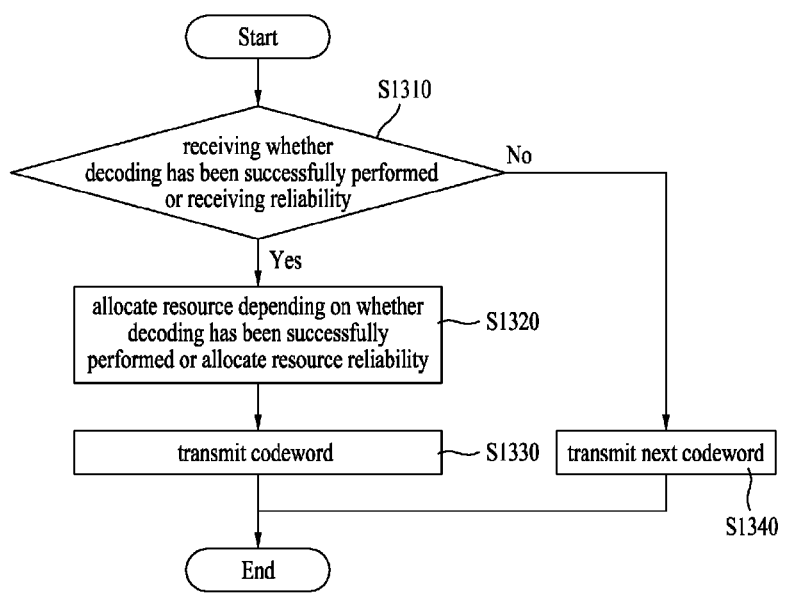
FIG. 13 is a flow chart illustrating a method for retransmitting packets according to other embodiment of the present invention.

FIG. 13 is a flow chart illustrating a method for retransmitting packets according to other embodiment of the present invention.

First of all, it is determined whether the receiving side has received retransmission information indicating whether decoding for a specific block constituting codewords has been successfully performed or reliability (S1310). At this time, if the retransmission information indicating whether decoding has been successfully performed for the specific block or reliability is not received, the transmitting side transmits next codeword (S1340).

If the retransmission information indicating whether decoding has been successfully performed for a specific block or reliability is received, the transmitting side allocates a resource to a corresponding block depending on whether decoding has been successfully performed or reliability (S1320).

If a resource is allocated to each block based on reliability, the transmitting side performs a corresponding modulation procedure, a corresponding repetition procedure, or a corresponding selection procedure of a proper channel for the block having low reliability, so as to improve reliability. The transmitting side can perform modulation and/or channel mapping for the block having high reliability, so as to lower reliability. Meanwhile, the part where decoding has been successfully performed or reliability is high may not be retransmitted.

Finally, the transmitting side transmits codewords constituting blocks to which the resource is allocated, to the receiving side (S1330). If packets are retransmitted based on reliability, the receiving side can use a combining method where a weight value is given in accordance with reliability of the corresponding packets as illustrated in Equation 1 and Equation 2.

Figure 14:
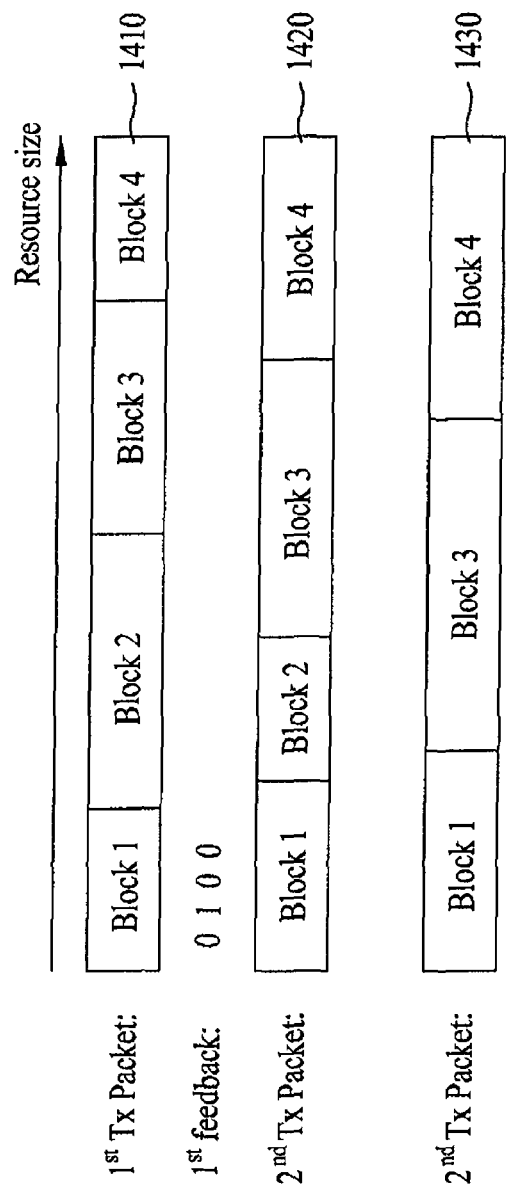
FIG. 14 is a diagram illustrating an example of a size of a resource allocated to each block in accordance with a resource allocation procedure of FIG. 13.

FIG. 14 is a diagram illustrating an example of a size of a resource allocated to each block in accordance with a resource allocation procedure of FIG. 13.

FIG. 14 illustrates a condition where the amount of a resource is varied during retransmission. In this case, the length of the block can represent change of modulation mode, bits of codewords belonging to the corresponding block, or repetition level.

It is assumed that after codewords or packets (1410) constituting blocks to which similar resources are allocated are initially transmitted, feedback information is received from the receiving side. At this time, the second block corresponding to '1' in the feedback information means the block where decoding has been successfully performed or the block having high reliability. In this case, the feedback information does not need to be mapped with each block 1:1.

Therefore, in the codewords or packets (1420) to be transmitted, the second block may be shorter than any other blocks, or may be omitted from the codewords or packets (1430) to be transmitted.

Preferably, the code lengths of all codewords are the same as one another. Also, if the codewords have different lengths, i.e., even if the weight distribution is not delta, the effect of retransmission can be improved in accordance with the aforementioned description. Furthermore, an average value of the soft decision distances can become equal for the codeword distance corresponding to all codeword distributions, codeword bits having the same codeword distance can be defined as a block considering weight distribution of codewords.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention relates to a method for retransmitting packets, which can improve packet decoding success probability of a receiving side during initial transmission or retransmission by controlling a type of transmission packets in accordance with feedback information of the receiving side. The present invention can be applied to a communication device, such as a mobile station and a base station, which retransmits packets when parts constituting codewords have different types of reliability, and its related algorithm.

The invention claimed is:
1. A method for retransmitting packets from a transmitting side, the method comprising:
  transmitting a packet including blocks to a receiving side,
    wherein the block is configured as codeword bits;

receiving, from the receiving side, first information indicating at least one block which has been successfully decoded and at least one block which has not been successfully decoded, adjusting the size of each block based on the first information, wherein adjusting the size of each block comprises increasing the size of a block which is not successfully decoded and reducing the size of a block which is successfully decoded, changing the mapping order of each block having an adjusted size; and, mapping each block to subcarriers in accordance with the changed mapping order, wherein mapping each block comprises:

mapping the block which is not successfully decoded to a first frequency band in which the block which is successfully decoded in a previous transmission is transmitted, and mapping the block which is successfully decoded to a second frequency band in which the block which is not successfully decoded in the previous transmission is transmitted; and retransmitting the packet without a new block in accordance with the mapped result to the receiving side.

2. The method of claim 1, wherein the first frequency band corresponds to a position having relatively low reliability and the second frequency band corresponds to a position having relatively high reliability.

3. The method of claim 1, wherein the size of the block which is not successfully decoded is increased by increasing the amount of parity bits and the size of the block which is successfully decoded is reduced by decreasing the amount of parity bits.

* * * * *